Sept. 29, 1936. T. F. BADDOCK 2,055,461
RESILIENT TIRE
Filed May 29, 1934

INVENTOR
Thomas F. Baddock
BY
ATTORNEYS

Patented Sept. 29, 1936

2,055,461

UNITED STATES PATENT OFFICE 2,055,461

RESILIENT TIRE

Thomas F. Baddock, Lenox, Mass.

Application May 29, 1934, Serial No. 728,119

10 Claims. (Cl. 152—8)

This invention relates to improvements in resilient tires for vehicles and more specifically relates to a resilient non-pneumatic filler for a tire casing of the usual pneumatic type.

One of the objects of this invention is to provide a more simplified structure for supporting a resilient tire casing by a mechanical spring structure in which the applied loads on the casing are more uniformly carried and in which the structure provides a larger load carrying area, and in which the advantageous operating characteristics of the pneumatic tube are obtained without its disadvantages.

Another and more specific object of the invention is to provide a non-pneumatic tire filler for a pneumatic type of tire casing in which the loads are directly carried on a plurality of separate block sections, which blocks are carried by two adjacent spring sections and in which sudden loads due to sharp projections are not transmitted to inactive areas of the tire casing but are absorbed without rebound or deflection of the vehicle axle.

Another object of the invention is to provide a series of modified cantilever type springs, the free ends of which are in partial frictional support on the adjacent springs, such springs being inserted as a body in a tire casing to give a soft but firm ride and with a non-collapsing structure which will prevent the casing from grounding on the rim.

Another object of the invention is to arrange the spring supports for the tire filler so that loads on the tire casing will pass radially through the adjacent spring and will have reacting forces in both springs to use both the cantilever and semi-elliptic characteristics.

Another object of the invention is to provide a plurality of load distributing blocks in a non-pneumatic and preferably rubber filler so that the ride of the vehicle will be more cushioned to give the advantages of balloon tires without the dangers of over- or under-inflation.

Other objects and advantages of my invention will appear from the following description thereof taken in connection with the attached drawing which illustrates a preferred form of embodiment thereof and in which.

The usual pneumatic tube and tire casing commonly used on motor vehicles has several disadvantages besides deterioration and expense. The pneumatic tube obeys the law of gases and when a load is suddenly impressed at one point, it is dissipated over the rest of the casing. All parts of the casing are therefore active at all times. Furthermore in case of deflation the casing grounds on the rim and goes through the maximum change of direction which weakens the casing. Then also the air slowly leaks out of the tube with the result that the reaction of the tire to load is uncertain and irregular.

It has been suggested that solid rubber tires be used but the initial compression of the rubber due to normal loading makes the wheel take abnormal loads due to shock and the tire takes but very little of this added load. This type of tire is usually limited to trucks. Springs between the tire and wheel have also been used but springs of the usual type are unsatisfactory because of the progressive loading around the tire and they are usually only suited for continuous radial loading which they are most able to carry and which stress is only theoretical.

I have found that I can use a combination of cantilever springs and load spreading blocks which may be adapted to the usual tire casing and which will have superior operating advantages over the pneumatic type tube and casing. It is free from the common faults of pneumatic tubes and is less expensive on a mileage basis while giving better satisfaction in supporting the vehicle.

Figure 1:
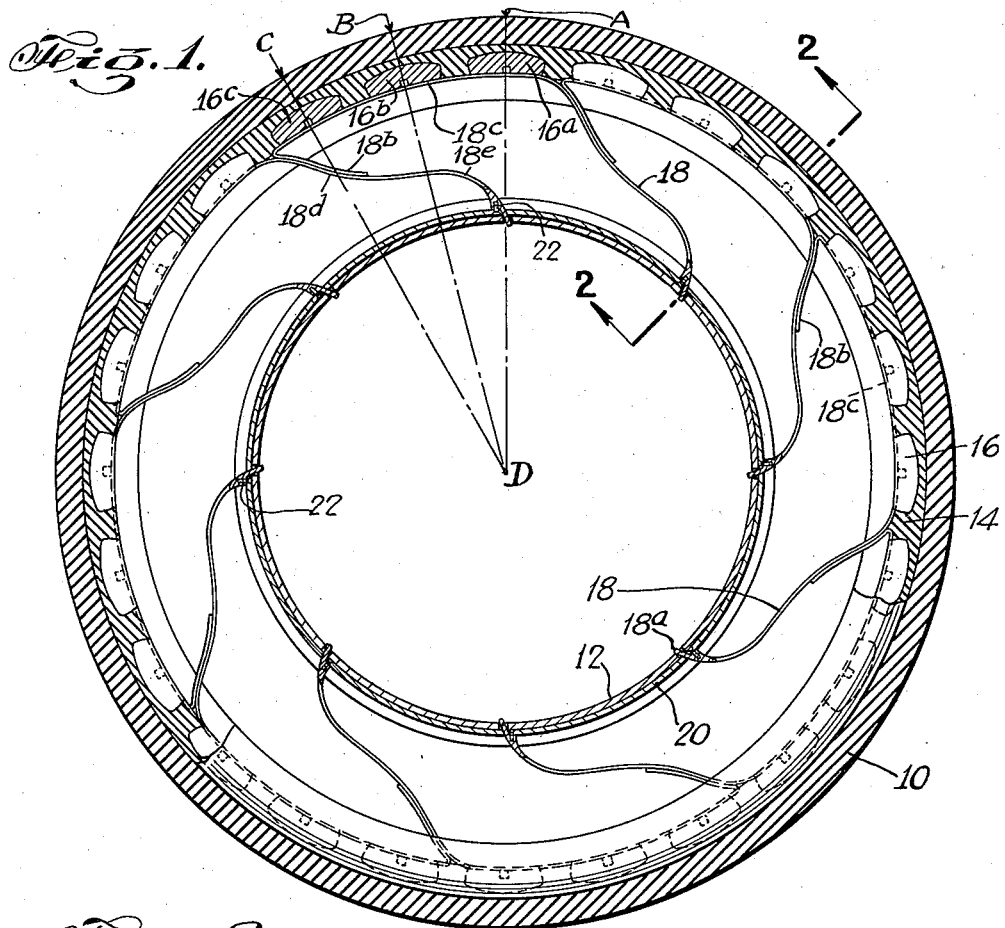
Figure 1 is a vertical section with parts broken away of a tire casing and intermediate support.
Figure 2:
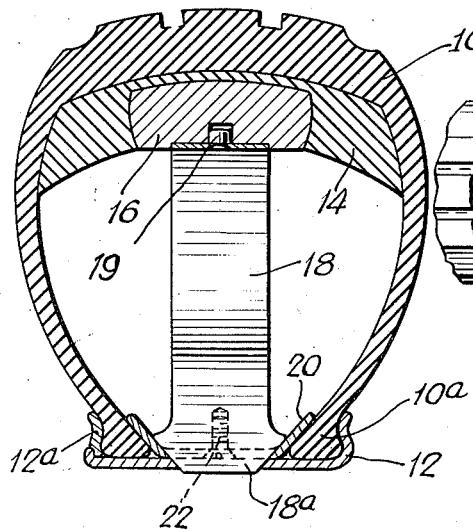
Figure 2 is a transverse section taken substantially along the line 2—2 of Figure 1, and, Figure 3 is a partial top plan view with parts broken away showing the arrangement of the internal structure.
Figure 3:
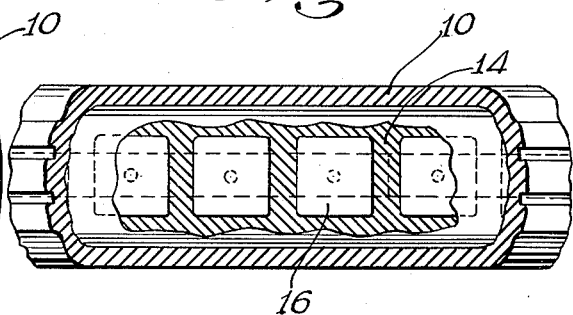

I prefer to use tire casings 10 of the usual type as shown in Figures 1 and 2 inasmuch as they are standard and economical articles of commerce and will fit all of the standard wheel rims 12 to which they are secured by the demountable ring 12a or by other usual means. I use, however, a non-pneumatic, resilient support for this casing and in my preferred construction, the filler 14 which is preferably of rubber, has a plurality of spaced openings, to receive the load carrying blocks 16. These blocks may be of any desired shape and are arranged to conform generally with the inner wall of the tire casing as shown in Figure 2.

The spring structure which carries and transmits the load on the tire from the casing 10 to the wheel rim 12 consists of a plurality of curved springs 18. These may be of a flat multi-curved shape, one end 18a projecting through the clamping ring 20 and being anchored thereto by the screws 22. The end 18a may also be of keystone shape and fit within a suitable slot in the rim 12 as shown in Figure 2. The free end 18b of the spring 18 rests on a curved portion of the adjacent spring on which it receives support.

Intermediate the fixed end 18a and the movable end 18b, the spring 18 has a load carrying section 18c which cooperates with a plurality of the blocks 16. These blocks are of any suitable light weight material such as pressed metal, hard rubber, aluminum, etc. Each spring 18 may carry one or more blocks and probably for light loads as shown in the preferred construction there may be three such blocks per spring. If heavier loads are encountered, it will of course be found desirable to use more springs. The blocks and springs have position retaining means such as the studs 19 which may be secured to the spring 18 and project into suitable apertures in the blocks 16.

The relation of the blocks and the springs as shown brings about an especially good load distribution factor and will maintain an even pressure while resiliently reacting against sudden shocks. Considering the radial load line for the load A which passes through the center D, for example, a load impressed on the casing above block 16a will pass directly through the fixed end of the adjacent spring leaf 18. This leaf, however, carries only the free end of the block attached spring. Such a load is therefore not directly supported but is carried by the cantilever part of the block attached spring together with a resultant of the next leaf. Due to the carrying end 18b of the block attached leaf, this may be considered as firmly fixed at 18b and the load carrying section 18c will act as a cantilever for the load at A. Therefore with the load on the near block 16a, there are two reacting cantilever forces.

Now considering the extreme block 16c, the line of a force at C passes through the center of the sliding contact between the end 18b of one spring (the block attached spring) and the supporting shelf 18d of the adjacent spring. The load is therefore carried by a cantilever spring action of the adjacent spring intermediate its fixed and movable ends and to this is added a further component of the cantilever action of the block attaching section 18c which will be effectively fixed at the block 16a.

A load applied at B is intermediate the effectively fixed ends of the load carrying spring section 18c and there will be a semi-elliptic action primarily. If however the load is increased, the ends of the load carrying section 18c of spring 18 will move under cantilever action of both the block attached spring and the adjacent spring.

The loads are distributed therefore over two springs, both of which may flex the entire distance between the sections 18c and 18e, if necessary. These forces, however, are not transmitted nor reacted to the disadvantage of the rest of the structure and objectionable reacting forces on opposite parts of the casing are eliminated.

The loads are designed to pass without substantial change in elevation of the wheel axle from one spring to another and to permit this continuity, the springs 18 have an advance shape which is increased by the applied load put on the springs prior to assembly. It is also to be noted that if an additional row of springs were found necessary in heavier loaded vehicles, they may be added and carried between the present springs. In some cases it may also be desirable to have a reverse row of springs for equivalent reactions in both directions. This however, is not normally necessary with light vehicles.

My structure is simple and inexpensive and permits bending or flexing of the tire over the loaded area in a manner similar to that when supported by the pneumatic tube and yet is non-pneumatic, does not deteriorate and retains a constant supporting pressure.

It is especially adapted for extra balloon type riding qualities without increase of cost and without the possibility of damage due to lack of inflation.

While I have shown a preferred form of embodiment of my invention I am aware that other modifications may be made thereto and I therefore desire a broad interpretation of my invention within the scope and spirit of the description thereof and of the claims appended hereinafter.

I claim:

1. A vehicle wheel of the class described comprising in combination with a closed tire casing, a resilient support therefor including a filler section having a plurality of openings therein, load distributing blocks positively anchored in said openings, an inner rim and a plurality of similar and separately secured modified cantilever type spring members extending between the rim and the blocks, the inner end of said springs terminating in a substantially straight portion being fixed to the said rim at an angle thereto, the other free ends of each spring being supported on the next adjacent spring whereby a load on the tire casing is distributed over an area between the two springs.

2. A resilient support for a pneumatic wheel tire casing which comprises a continuous rubber insert adapted to fit the interior of the casing and contact with the side walls thereof, said insert having a plurality of open sections on the inner circumference thereof, a plurality of rigid blocks anchored in said open sections, and spring members engaging, throughout an intermediate portion, with said blocks, one end of said spring members terminating in a substantially straight portion and being detachably anchored in the wheel rim, and at an angle thereto, and the other end of said spring members being in frictional and supported contact with the adjacent spring member, said spring members being separately assembled.

3. In combination with a tire casing for a vehicle wheel, of a resilient filler and a resilient support for said casing comprising a plurality of separate springs adapted to be anchored in the wheel rim, each of said springs having an intermediate curved portion, a load carrying portion and a free end, the curved portion of one spring affording a support for the free end of the adjacent spring, and a plurality of blocks anchored in said resilient filler and supported by the load carrying portion of the springs, said blocks having a load distributing area to distribute the load on said casing over a substantial part of the respective springs.

4. In combination with a tire casing for a vehicle wheel of a resilient, non-pneumatic support within said casing, comprising a plurality of supporting springs, means to anchor said springs on one end to the wheel rim and at an angle thereto, said springs having a curved cantilever portion and a load supporting portion, said load supporting portion being radially over the curved cantilever portion of the adjacent spring, said spring having a free end frictionally supported on a part of the curved portion of the adjacent spring, said free end being substantially parallel to said adjacent spring.

5. In combination with a tire casing for a vehicle wheel, a filler portion adjacent the tread section and a plurality of springs to support said filler section, one end of said springs terminating in a substantially straight portion and being fixed to the wheel rim at an angle thereto, said springs having a plurality of cooperating load distributing blocks anchored in said filler section, said springs having a curve between the fixed point and the block supporting portion so that a load on one end of the block supporting portion will pass radially through the rim connection of the adjacent spring.

6. In combination with a tire casing for a vehicle wheel, of a resilient non-pneumatic filler for said casing comprising a plurality of curved cantilever type springs, said springs having an inner end terminating in a substantially straight portion and being anchored to the wheel rim at an angle thereto, an intermediate curved portion, a load supporting portion, and a free end, the load supporting portion overlying the curved portion of the adjacent spring whereby a load on the center of the block supporting section will pass radially through the substantial center of the intermediate curved section of the adjacent spring approximately midway between its fixed end and the nearest load supporting end.

7. In combination with a tire casing for a vehicle wheel, of a resilient filler and support for said casing, comprising a plurality of springs of the cantilever type, each spring terminating in a substantially straight inner end anchored at an angle to the vehicle rim, said springs having an intermediate curved portion, a block supporting portion and a free end, the block supporting portion overlying the curved portion of the adjacent spring so that a load on the extreme end of the load supporting section of one spring will pass radially through the free supporting end of such spring at substantially its point of contact with the adjacent spring.

8. In combination with a tire casing for a vehicle wheel, of a resilient filler and support for said casing, comprising a plurality of springs of flat curved leaf type, said springs having a load carrying section, means to anchor said springs at one end to the wheel rim at an angle thereto, the other end of said springs being substantially parallel to and being carried in sliding relation on the adjacent spring near its approach to the load carrying section, and a plurality of load supporting blocks carried on the load carrying section of one spring, said blocks being radially above the adjacent spring, and means to locate said blocks positively with relation to said casing.

9. In combination with a tire casing for a vehicle wheel, of a resilient filler and support for said casing, comprising a plurality of springs of flat curved type having a load carrying section, means to anchor said springs at one end to the wheel rim at an angle thereto, the other end of said springs being substantially parallel to and being carried in sliding relation on the adjacent spring near its approach to the load carrying section and a plurality of load supporting blocks carried on the load carrying section of one spring, said blocks being radially above the adjacent spring, said blocks being of light metallic material and having locating portions cooperating with opposite locating portions on the spring, and means to locate said blocks positively with relation to said casing.

10. In combination a resilient tire casing of the type mainly used with pneumatic tubes having an open underside and beads on the edges of the casing, a separable annular rim cooperating with the beaded edges of said casing to fit over the periphery of a wheel and to be secured removably thereto, a plurality of load distributing blocks adjacent the inner casing wall opposite said open side and a plurality of spring members disposed within the casing to support the same yieldably under working pressures, the inner ends of said spring members being connected with said rim, intermediate portions thereof resting in supporting relation to said blocks and end portions thereof supported on portions of adjacent springs in advance of said intermediate portions.

THOMAS F. BADDOCK.

CERTIFICATE OF CORRECTION.

Patent No. 2,055,461. September 29, 1936.

THOMAS F. BADDOCK.

It is hereby certified that error appears in the printed specification of the above numbered patent requiring correction as follows: Page 3, second column, lines 12 and 13, claim 8, strike out the comma and words ", and means to locate said blocks positively with relation to said casing; and that the said Letters Patent should be read with this correction therein that the same may conform to the record of the case in the Patent Office.

Signed and sealed this 15th day of December, A. D. 1936.

Henry Van Arsdale
Acting Commissioner of Patents.

(Seal)